US012692913B2

(12) United States Patent
Cattaneo

(10) Patent No.: US 12,692,913 B2
(45) Date of Patent: Jul. 28, 2026

(54) FLOATING CALIPER

(71) Applicant: Brembo S.p.A., Curno (IT)

(72) Inventor: Nicolo Cattaneo, Curno Bergamo (IT)

(73) Assignee: BREMBO S.P.A., Curno Bergamo (IT)

( * ) Notice: Subject to any disclaimer, the term of this patent is extended or adjusted under 35 U.S.C. 154(b) by 340 days.

(21) Appl. No.: 17/804,857

(22) Filed: Jun. 1, 2022

(65) Prior Publication Data

US 2022/0381304 A1    Dec. 1, 2022

(30) Foreign Application Priority Data

Jun. 1, 2021    (IT) ........................ 102021000014294

(51) Int. Cl.
*F16D 55/227*       (2006.01)
*F16D 55/2265*      (2006.01)
*F16D 55/00*        (2006.01)

(52) U.S. Cl.
CPC ..... F16D 55/227 (2013.01); F16D 55/22655 (2013.01); *F16D 2055/0041* (2013.01)

(58) Field of Classification Search
CPC ............. F16D 55/22655; F16D 55/227; F16D 55/2265; F16D 2055/007; F16D 2055/0041
See application file for complete search history.

(56) References Cited

U.S. PATENT DOCUMENTS 4,121,845 A * 10/1978 Reynolds ................ F16D 65/18
                                                    277/924
4,151,899 A * 5/1979 Wright .............. F16D 55/22655
                                                    188/73.38

4,311,219 A    1/1982 Watanabe et al.
4,334,599 A * 6/1982 Ritsema ................ F16D 55/227
                                                    411/537
4,557,354 A * 12/1985 Sakakibara ....... F16D 55/22655
                                                    277/636

(Continued)

FOREIGN PATENT DOCUMENTS

DE      102012021690 A1 * 5/2014    ....... F16D 55/22655
EP          3246585 A1 * 11/2017    ......... F16D 65/0025

(Continued)

OTHER PUBLICATIONS

Italian Patent and Trademark Office, Search Report in Application No. IT2021000014294, dated Feb. 17, 2022, 8 pages.

*Primary Examiner* — Robert A. Siconolfi
*Assistant Examiner* — Mahbubur Rashid
(74) *Attorney, Agent, or Firm* — Marshall & Melhorn, LLC

(57)    ABSTRACT

A floating caliper may have a caliper body where the caliper body is movably supported in an axial direction on at least at one guide pin. The guide pin may have a pin sliding portion. The caliper body may have a pin seat, which slidingly accommodates a portion of the pin sliding portion. The floating caliper may also have a sealing arrangement between the pin seat and the guide pin. A sealing arrangement outer surface or a sealing arrangement inner surface may have an axial extension, which is smaller than a pin seat axial extension or the length of the pin sliding portion, respectively, creating, in at least one position of the floating caliper during the axial sliding thereof, at least one sealing arrangement channel between the sealing arrangement and the pin seat or the pin sliding portion.

11 Claims, 10 Drawing Sheets

(56)          References Cited

U.S. PATENT DOCUMENTS

| | | | | | |
|---|---|---|---|---|---|
| 4,685,686 | A | | 8/1987 | Weiler | |
| 4,775,033 | A | * | 10/1988 | Heibel | F16D 65/092 |
| | | | | | 188/73.31 |
| 4,781,273 | A | * | 11/1988 | Fujinami | B61H 5/00 |
| | | | | | 188/73.45 |
| 4,832,161 | A | * | 5/1989 | Weiler | F16D 55/22655 |
| | | | | | 277/637 |
| 4,926,979 | A | * | 5/1990 | Odaka | F16D 55/227 |
| | | | | | 188/73.44 |
| 4,961,480 | A | | 10/1990 | Weiler et al. | |
| 5,036,957 | A | | 8/1991 | Fouilleux et al. | |
| 5,299,665 | A | | 4/1994 | Weiler et al. | |
| 5,927,446 | A | * | 7/1999 | Evans | F16D 55/227 |
| | | | | | 188/73.44 |
| 6,039,156 | A | * | 3/2000 | Schneider | F16D 55/22655 |
| | | | | | 188/73.44 |
| 6,811,158 | B2 | * | 11/2004 | Heinlein | F16J 3/041 |
| | | | | | 277/634 |
| 7,845,473 | B2 | * | 12/2010 | Tomita | F16D 55/227 |
| | | | | | 188/73.39 |
| 10,305,161 | B2 | * | 5/2019 | Carr | H01P 11/003 |
| 2014/0097050 | A1 | * | 4/2014 | Crippa | F16D 55/227 |
| | | | | | 188/73.44 |
| 2020/0056668 | A1 | | 2/2020 | Fischer et al. | |

FOREIGN PATENT DOCUMENTS

| | | | | | |
|---|---|---|---|---|---|
| EP | 3633224 | A1 | | 8/2020 | |
| GB | 2174157 | A | | 10/1986 | |
| GB | 2182990 | A | * | 5/1987 | F16D 55/22655 |
| JP | H02236029 | A | * | 9/1990 | |
| JP | 2004036799 | A | | 2/2004 | |
| JP | 2017214962 | A | | 12/2017 | |
| JP | 2019128023 | A | | 8/2019 | |
| WO | 2012156849 | A1 | | 11/2012 | |
| WO | 2020189356 | A1 | | 9/2020 | |

* cited by examiner

FLOATING CALIPER

FIELD

The present invention relates to a floating caliper.

In particular, in a disc brake, the brake caliper is arranged straddling the outer peripheral margin of a brake disc. The brake caliper usually comprises a body having two elongated elements, or portions, which are arranged to face opposite braking surfaces of a disc. Clutch pads are provided arranged between each elongated element of the caliper and the braking surfaces of the brake disc. At least one of the elongated elements of the caliper body has at least one actuator, e.g., a cylinder adapted to accommodate a hydraulic piston capable of applying a thrust action on the pads, abutting them against the braking surfaces of the disc to apply a braking action on the vehicle.

BACKGROUND

The brake calipers are usually constrained to a supporting structure, which remains firmly connected to the vehicle, such as, for example, a suspension of a vehicle, more particularly a fork or swing arm of the suspension of a motorcycle.

In a typical arrangement, one of the two elongated elements has two or more attachment portions of the caliper body to the supporting structure, e.g., by providing slots or eyelets, e.g., arranged axially, or through holes, e.g., arranged radially, adapted to receive screws for fixing the caliper, which are accommodated with the ends thereof in threaded holes provided on the caliper support.

In a typical caliper body construction, the elongated elements arranged facing the braking surfaces of the disc are mutually connected by bridge-like elements arranged straddling the disc.

In particular, a service and/or parking disc brake comprises a brake disc, which rotates together with a wheel of a vehicle. Brake pads face the brake disc and are accommodated in a brake caliper arranged straddling said brake disc. Said pads are stressed either directly or indirectly to abut against the opposite braking surfaces of said brake disc by actuation means of various types, including hydraulic means or, especially in the case of parking brakes, lever means.

In particular, in a floating caliper disc brake, the brake pad on one side, usually the side facing the vehicle, is displaced relative to the caliper because it is stressed by thrust means, e.g. a piston accommodated in the caliper body, and stressed by a brake fluid pressurized by the command of the vehicle driver, toward the disc. This happens both when the brake is applied and when the pad is worn.

The brake pad on the other side of the disc, e.g., the side facing the vehicle wheel, is fixed relative to the caliper. To provide a clamping force on both sides of the disc, the entire caliper moves axially relative to the brake disc when the brake is applied to take the brake pad, which is fixed, to the caliper, into contact with the brake disc. The entire caliper also moves axially relative to the brake disc to allow for pad and disc wear. Said disc brake is known, for example, from U.S. Pat. No. 4,685,686 as well as from EP3633224, JP2017214962, JP2019128023, WO2020189356.

In order to allow this, the caliper is typically mounted on a brake carrier or brake support by means of two guide pins.

At least one of said guide pins is bolted to the brake support and slides inside brake caliper holes or seats. This guide pin must be sealed, ideally, on both ends to protect from the ingress of water and dirt from the road at least the length of the pin that serves as a guide for the caliper body. However, due to the very limited space available in some vehicles, it is often not possible to provide a good seal along the entire movement of the caliper while it adapts to the wear of the pads and discs.

In particular, a common design for a sliding caliper brake includes a primary guide pin and a secondary guide pin.

The primary guide pin slides entirely inside a blind hole provided in the caliper, which hole is deep enough to surround the guide pin over the entire stroke of the caliper movement caused by pad and disc wear. The end of the hole can then be closed by a protective cap, substantially preventing the ingress of dirt.

Otherwise, the secondary guide pin generally slides inside a short through-hole in the caliper. The secondary guide pin passes completely through the caliper and protrudes from the other side when the pad is new, but when the pads and disc are worn, the caliper slides along the secondary pin, so any protective cap may intrude on other vehicle components limiting the caliper travel and thus forcing the use of longer and bulkier couplings. It is impossible to install a protective cap over the entire hole in this situation.

Solutions of this kind are known, for example, from document JP2004036799.

One way it was attempted to partially seal the secondary guide pin was to provide a sliding seal.

This does not prevent dirt from accumulating on the exposed surface of the guide pin, thus initiating guide pin corrosion, but it limits the amount of dirt that can enter between the outer surface of the guide pin and the inner surface of the caliper hole. However, this solution is of limited effectiveness, and the presence of the scraper seal increases the frictional resistance to the guide pin sliding inside the hole. Furthermore, the guide pin must be made of expensive stainless steel to inhibit corrosion to achieve acceptable service life.

SUMMARY

Therefore, the need remains felt for a floating caliper having a secondary guide pin of limited size, or equal size of increased stroke, but at the same time adequately insulated from damp and dirt.

These and further objects are achieved by a floating caliper as described in the claims attached herewith and a method according to the claims.

Further objects, solutions, and advantages are present in the embodiments described below and claimed in the dependent claims appended herewith.

The suggested solutions allow for a floating caliper having a secondary guide pin sealing arrangement capable of facilitating the axial movement of the caliper in a reduced size.

By virtue of the described embodiments, the outer cylindrical contact between the caliper body and the sealing arrangement is maintained unchanged, but the inner section between the sealing arrangement and guide pin is reduced, leaving the sealing arrangement in contact in the central part thereof.

In this way, a free channel is created, which allows the coupling portion of the sealing arrangement to enter the pin seat of the caliper body, allowing the caliper more travel.

Alternatively, the same travel can be covered by reducing the size of the current calipers.

Additionally, the guiding function of the guide pin and the sealing arrangement resting thereon is improved, by reducing the constraint in the inner part of the sealing arrangement so that the coupling portions can enter the pin seat of the caliper body by wrapping themselves in the seat thereof.

Therefore, the following are achieved by virtue of the suggested solutions:

a reduction in the size of the secondary guide (simplified sealing arrangement development for elevated travels);

increased recovery for the caliper (increased sealing arrangement travel in reduced sizes);

the impossibility of an incorrect assembly process of the sealing arrangement due to the symmetry of the sealing arrangement geometry;

caliper sliding is facilitated by reducing the extension of the cylindrical contact constraint of the secondary guide pin with the sealing arrangement.

DESCRIPTION OF THE FIGURES

Various embodiments of the invention are now described below through embodiments provided only by way of non-limiting example, while in particular referencing the accompanying figures, in which.

DETAILED DESCRIPTION

Figure 1:
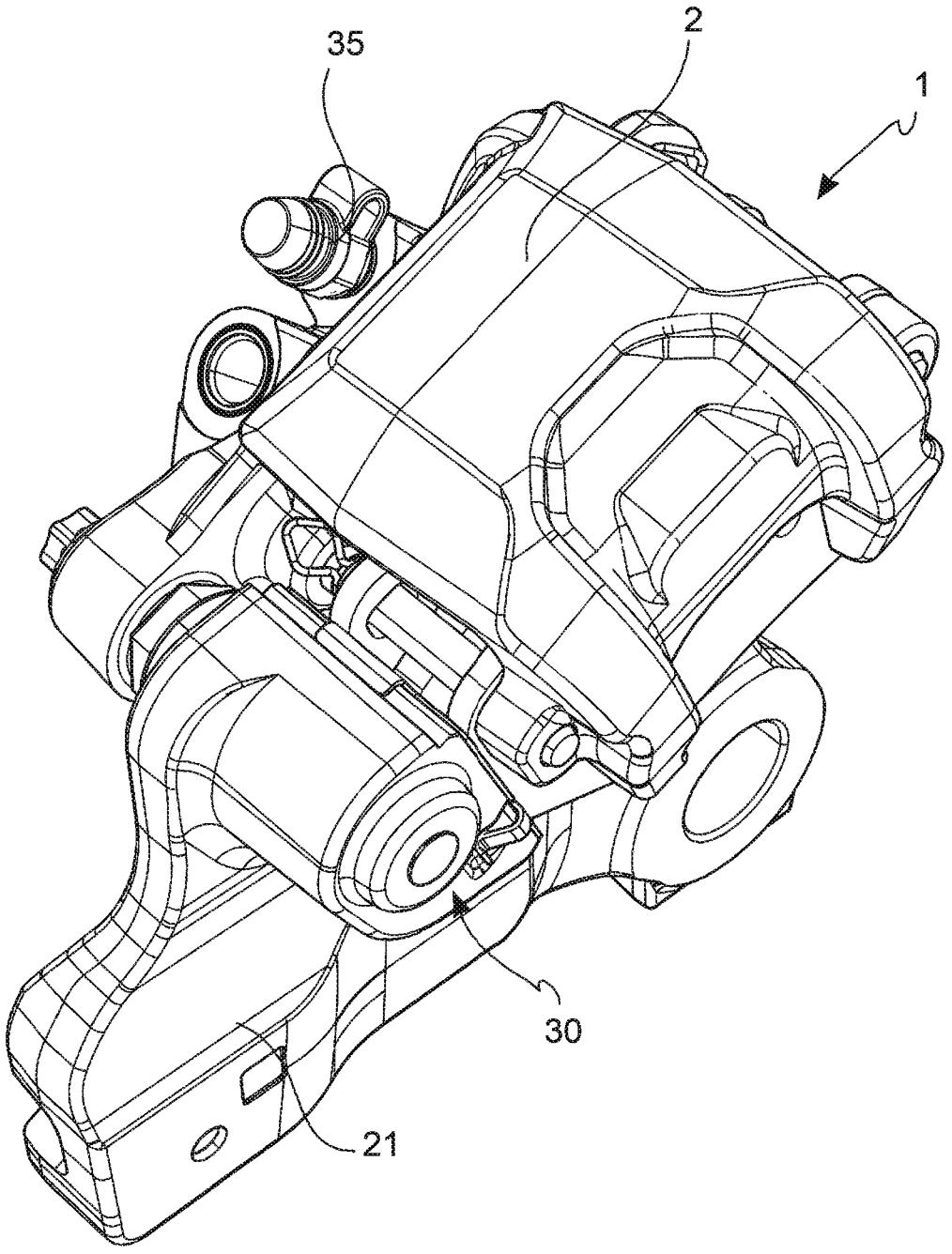
FIG. 1 shows an axonometric view of a floating brake caliper or floating caliper.
Figure 2:
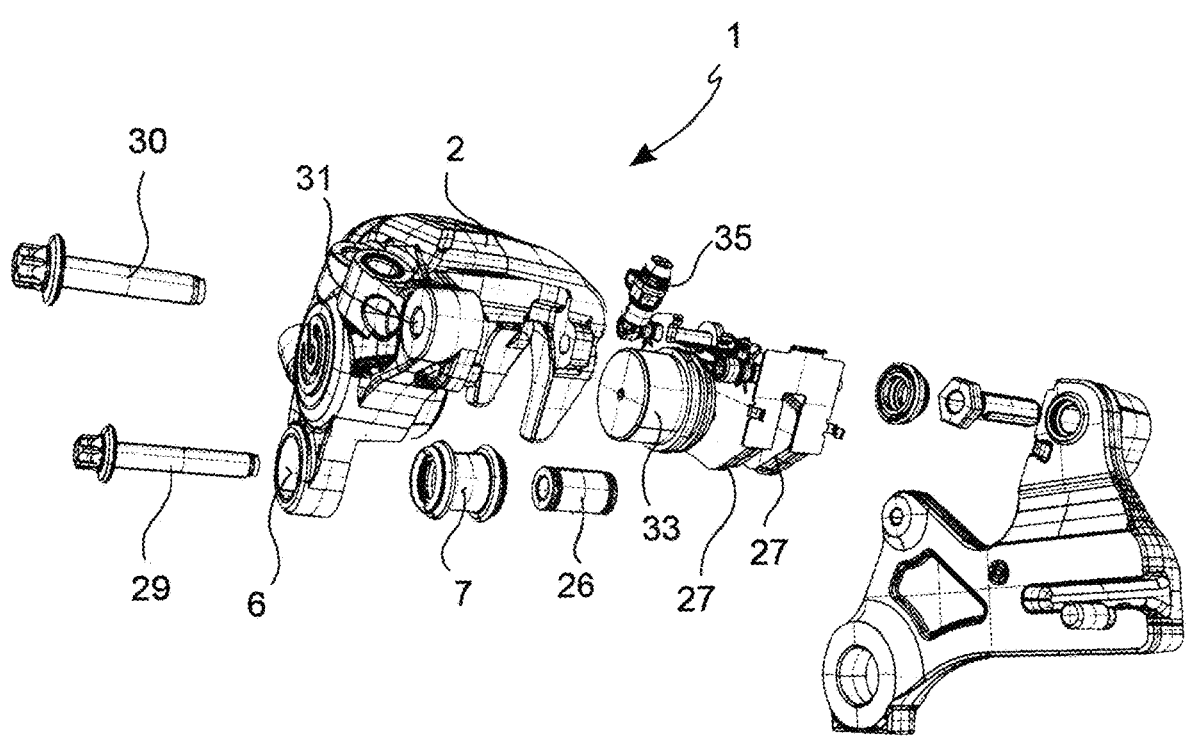
FIG. 2 shows an axonometric view of the floating caliper in FIG. 1 with parts separated.
Figure 3:
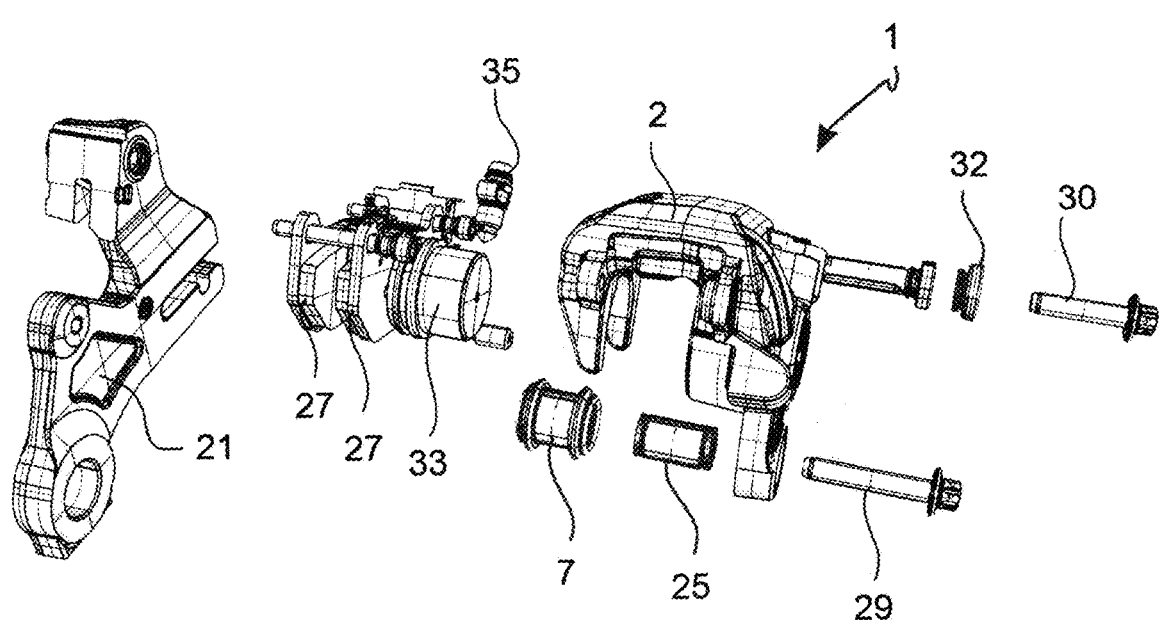
FIG. 3 shows an axonometric view of the floating caliper in FIG. 1, with parts separated, in a further view.
Figure 4:
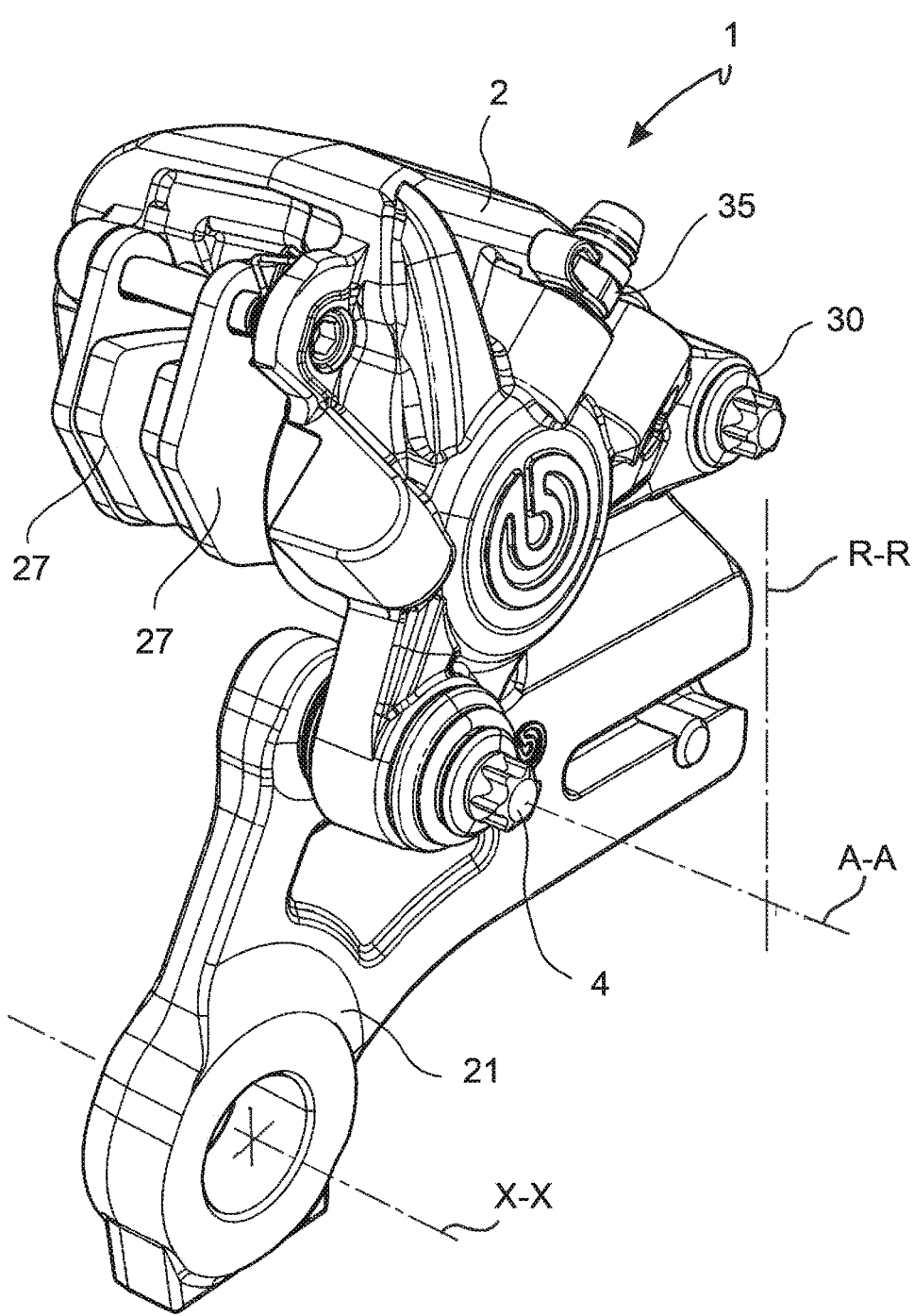
FIG. 4 shows an axonometric view of the floating caliper in FIG. 1.
Figure 5:
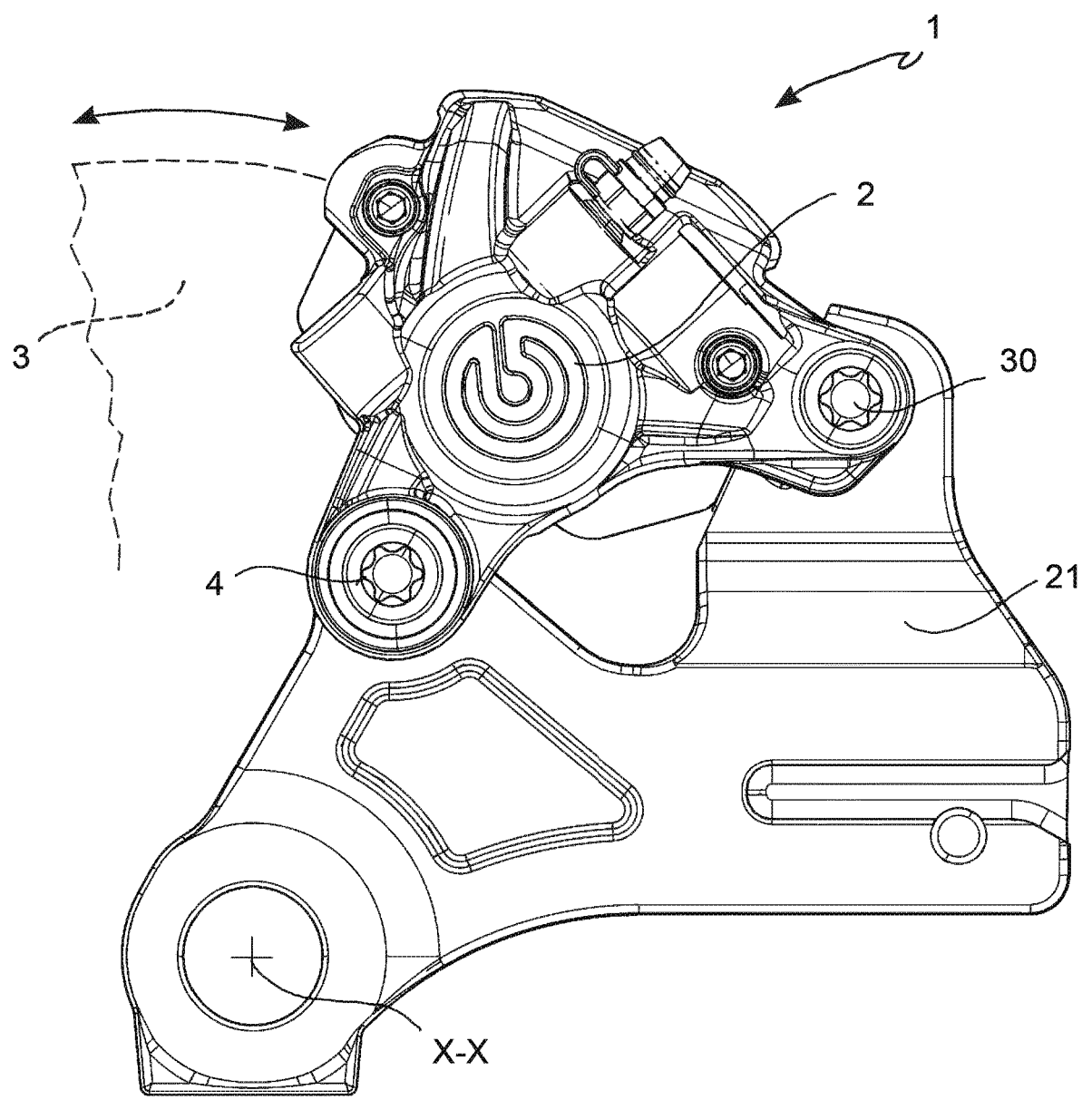
FIG. 5, shows an axial view, in FIG. 1.
Figure 6:
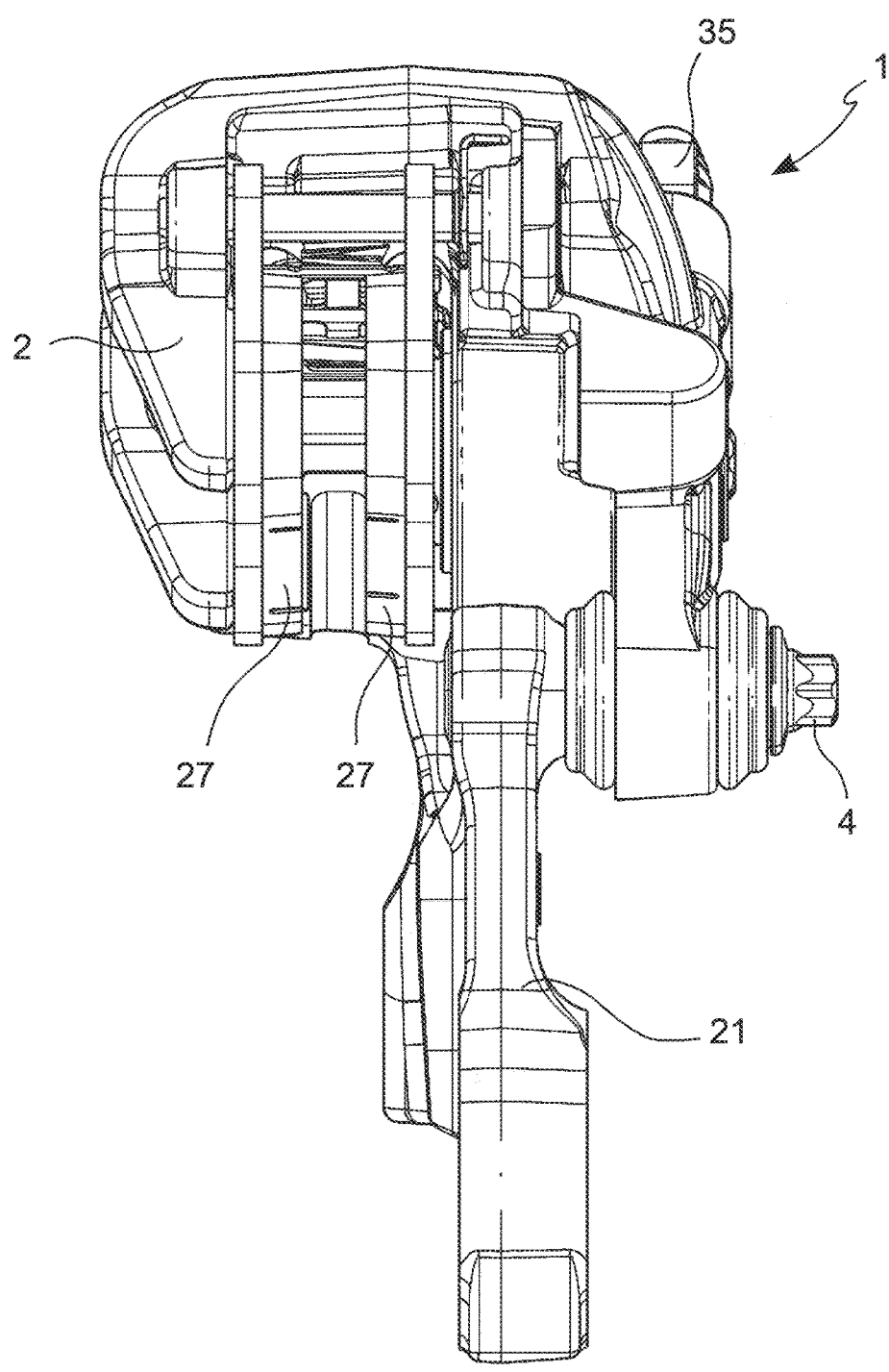
FIG. 6, shows a circumferential view in FIG. 1.
Figure 7:
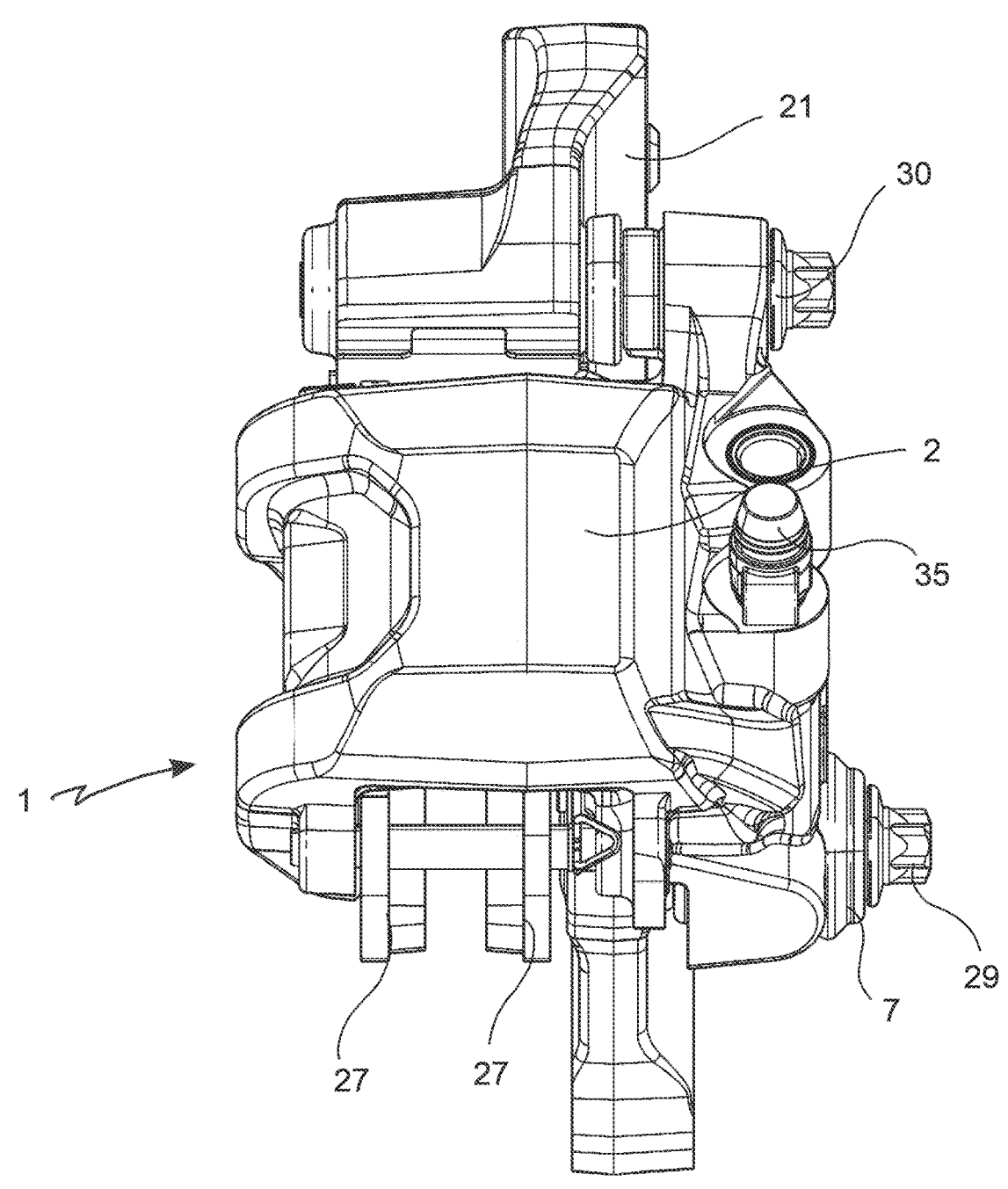
FIG. 7 shows a radial view of the caliper in FIG. 1.
Figure 8:
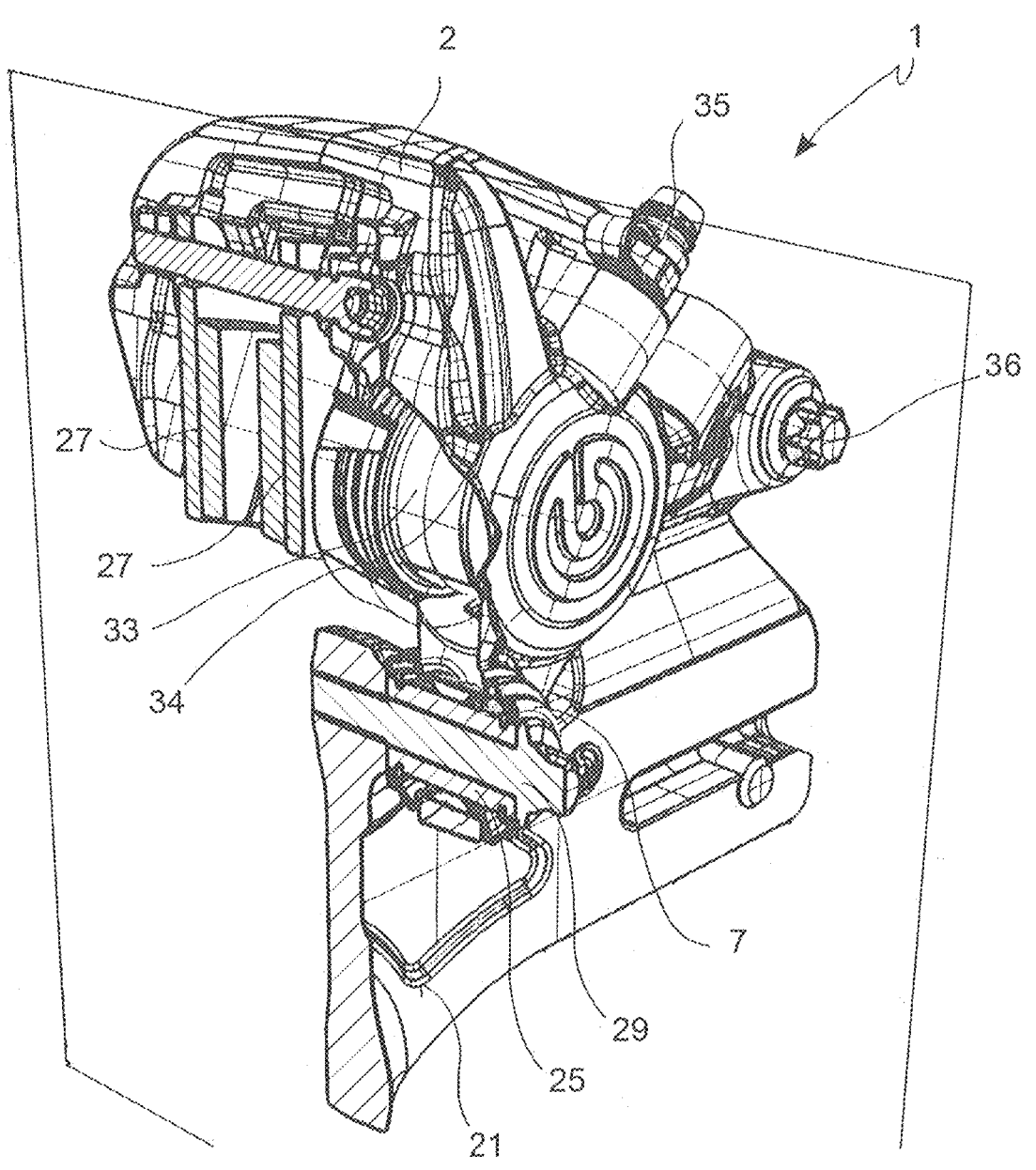
FIG. 8 shows an axonometric view of the floating caliper in FIG. 1 sectioned along the axis of the secondary guide pin.
Figure 9:
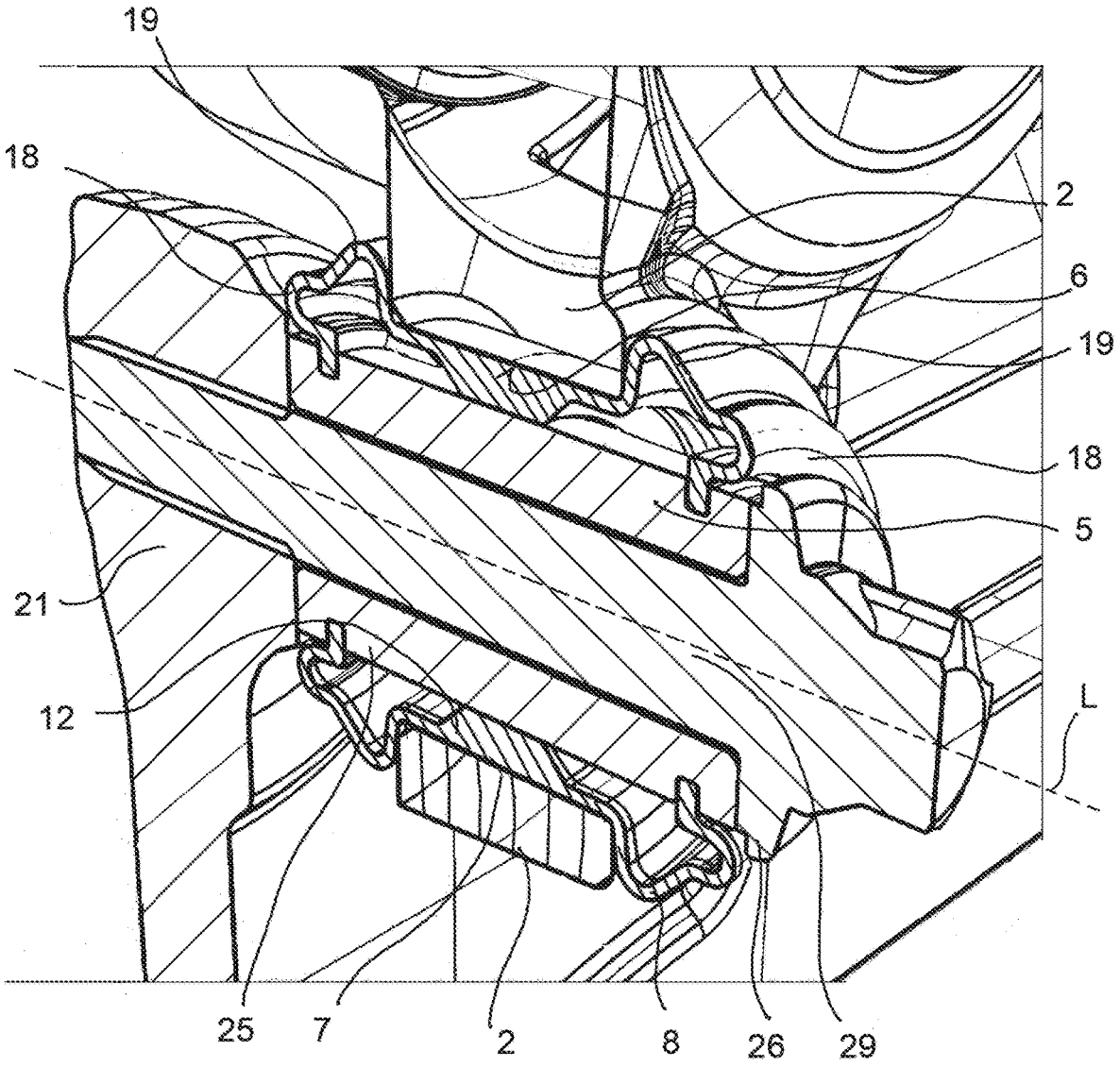
FIG. 9 shows a sectioned axonometric view of a detail of the guide pin coupling and pin seat of the caliper in FIG. 8.
Figure 10:
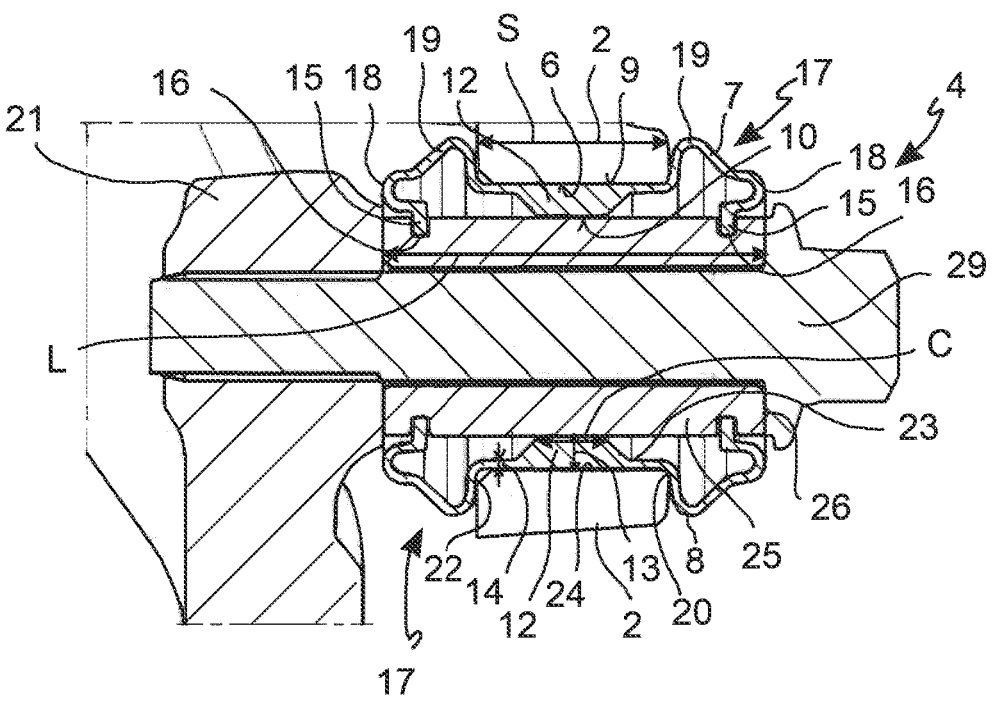
FIG. 10 shows a section view of a detail of a guide pin fixed to a caliper support and on which a floating caliper is fitted.
Figure 11:
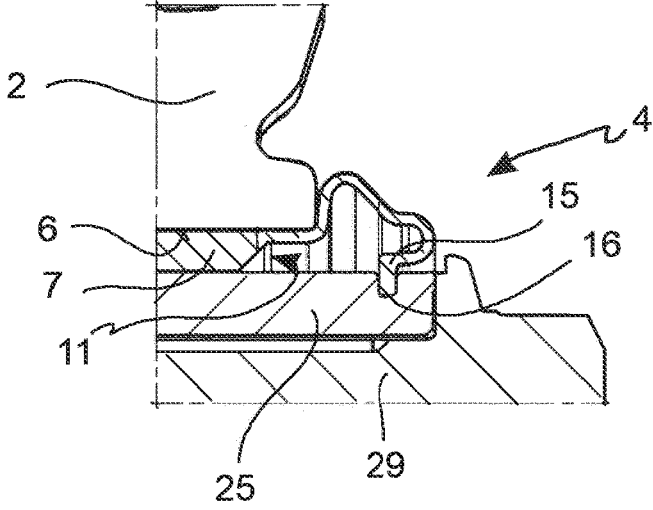
FIG. 11 shows a section view of an enlargement of the detail in FIG. 10.
Figures 12, 13:
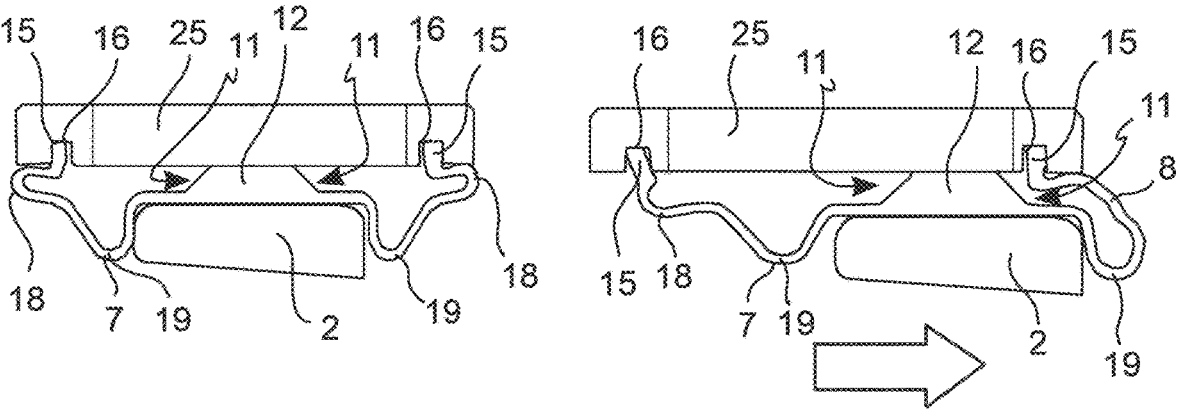
FIG. 12 shows a section view of a detail of the sealing arrangement coupling, associated with the edges of a pin seat, with a guide pin, and the position of non-worn pads and disc.
FIG. 13 shows a section view of a detail of the sealing arrangement coupling, associated with the edges of a pin seat, with a guide pin, and the position of the caliper and sealing arrangement with worn pads and/or disc.

According to a general embodiment, a floating caliper 1 comprises a caliper body 2 arranged straddling a brake disc 3.

Said brake disc 3 is rotating about a rotation axis X-X, which defines an axial direction A-A, a radial direction R-R orthogonal to said axial direction A-A, and a circumferential direction C-C orthogonal to said axial direction A-A and to said radial direction R-R.

Said caliper body 2 is movably supported in axial direction A-A at least at one guide pin 4.

According to an embodiment, said guide pin is firmly connected to a caliper support or caliper holder 21. For example, said guide pin 4 comprises a stay bolt screwed to a threaded hole of the caliper support 21.

Again according to a general embodiment, said at least one guide pin 4 comprises a pin sliding portion 5 of predetermined pin axial extension L.

Said caliper body 2 comprises a pin seat 6, which slidingly accommodates a portion of said pin sliding portion 5.

Said pin seat 6 has a predetermined pin seat axial extension S.

Said floating caliper 1 further comprises a sealing arrangement 7, also referred to as "protective cap" or "sealing boot", interposed between said pin seat 6 and said guide pin 4.

Said sealing arrangement 7 comprises a tubular-shaped sealing arrangement body 8 made in one piece, which crosses said entire pin seat 6.

Said sealing arrangement 7 comprises a sealing arrangement outer surface 9 in contact with said pin seat 6.

Said sealing arrangement 7 comprises sealing arrangement inner surface 10 in contact with said pin sliding portion 5.

Advantageously, at least either of said sealing arrangement outer surface 9 or sealing arrangement inner surface 10 comprises an axial extension C, which is smaller than the pin seat axial extension S or the length of the pin sliding portion L, respectively, thus creating, in at least one position of the floating caliper 1 during the axial sliding thereof, at least one sealing arrangement channel 11 between said sealing arrangement 7 and said pin seat 6 or said pin sliding portion 5.

Said at least one sealing arrangement channel 11 is open, i.e. it comes out of said pin seat 6.

According to an embodiment, said floating caliper 1 is slidingly supported by a caliper support 21 by a first guide pin or main guide pin 30, and a second guide pin or secondary guide pin 4.

According to an embodiment, the main guide pin 30 is accommodated in a main guide pin seat 31 and protected by a main guide pin sealing arrangement 32. The sealing arrangement 32 remains crimped to the support and the nut screw, thus creating a single component.

According to an embodiment, during actuation of the floating caliper 1, thrust means, e.g., a piston 33 accommodated in a cylinder 34 provided in the caliper body 2 and actuated by pressurized fluid fed to the caliper body by feeding lines provided with a bleeding device 35, said thrust means stress a first pad 27 to abut against a first braking surface of the brake disc 3. By reaction, the floating caliper slides on said main guide pin 30 and secondary guide pin 4 and stresses an opposite pad 27 facing an opposite braking surface of the brake disc 3.

According to an embodiment, said sealing arrangement inner surface 10 comprises an axial extension C, which is smaller than the length of the pin sliding portion L, thus creating, in at least one position of the floating caliper 1 during the axial sliding thereof, at least one sealing arrangement channel 11 between said sealing arrangement 7 and said pin sliding portion 5.

According to an embodiment, said sealing arrangement 7 comprises a sealing arrangement foot 12, which forms said sealing arrangement inner surface 10 and has a sealing arrangement foot thickness 13, assessed in a section obtained by means of a plane comprising an axial direction A-A and a radial direction R-R equal to the predetermined distance between said pin sliding portion 5 and said pin seat 6.

According to an embodiment, with the exception of said sealing arrangement foot 12, the remaining sealing arrangement portions of said sealing arrangement 7 have a sealing arrangement thickness 13, assessed in a section obtained by means of a plane comprising an axial direction A-A and a radial direction R-R, which is less than said sealing arrangement foot 12 thickness.

According to an embodiment, said sealing arrangement foot 12 has a section, in a plane comprising an axial direction A-A and a radial direction R-R, which is substantially trapezoidal in shape, with smaller base facing said pin sliding portion 5.

According to an embodiment, when the floating caliper 1 is in the non-worn pad and brake disc position, said sealing arrangement foot 12 delimits two opposite sealing arrangement channels 11 between said sealing arrangement 7 and said pin sliding portion 5.

According to an embodiment, said sealing arrangement 7 comprises at least one coupling portion 15 accommodated in a pin coupling seat 16, thus restraining said sealing arrangement 7 to said pin sliding portion 5.

Said sealing arrangement channel 11 is open and in communication with said coupling portion 15.

According to an embodiment, said sealing arrangement 7 comprises two coupling portions 15 accommodated in two pin coupling seats 16 arranged opposite to each other relative to said pin seat 6. Each coupling portion 15 accommodated in said pin coupling seats 16 constrains said sealing arrangement 7 to said pin sliding portion 5.

Said sealing arrangement channel 11 is open and in communication with one of said coupling portions 15.

According to an embodiment, when the floating caliper 1 is in the non-worn pad and brake disc position, said sealing arrangement 7 comprises at least one folding sealing arrangement portion 17.

Said folding sealing arrangement portion 17 forms at least two loops 18, 19, in particular a folding sealing arrangement portion axial loop 18 and a folding sealing arrangement portion radial loop 19.

Said folding sealing arrangement portion axial loop 18 has concavity facing the axial direction A-A.

Said folding sealing arrangement portion radial loop 19 has concavity facing the radial direction R-R.

According to an embodiment, when the floating caliper 1 is in the non-worn pad and brake disc position, said sealing arrangement 7 comprises two folding sealing arrangement portions 17 placed on opposite sides to said pin seat 6.

A first folding sealing arrangement portion 17 is placed close to a caliper support 21 and forms at least two loops 18, 19, in particular, a folding sealing arrangement portion axial loop 18 and a folding sealing arrangement portion radial loop 19.

Said folding sealing arrangement portion axial loop 18 has concavity facing the axial direction A-A away from said caliper support 21.

Said folding sealing arrangement portion radial loop 19 has concavity facing the radial direction R-R, facing towards said guide pin 4.

A second folding sealing arrangement portion 17 is placed on the opposite side of the pin seat 6 relative to a caliper support 21 and forms at least two loops 18, 19, in particular, a folding sealing arrangement portion axial loop 18 and a folding sealing arrangement portion radial loop 19.

Said folding sealing arrangement portion axial loop 18 has concavity facing the axial direction A-A, facing towards said caliper support 21.

Said folding sealing arrangement portion radial loop 19 has concavity facing the radial direction R-R, facing towards said guide pin 4.

According to an embodiment, said pin seat 6 is delimited on the side away from a caliper support 21, by an opposite supporting seat edge 20.

Said pin seat 6 is delimited on the side facing a caliper support 21 by a supporting side seat edge 22.

Said pin seat 6 is delimited by a pin seat inner surface 24, which extends between said opposite supporting seat edge 20 and said supporting side seat edge 22.

Said sealing arrangement 7 comprises a seat sealing arrangement length 23 embraces said opposite supporting seat edge 20, said pin seat inner surface 24, said supporting side seat edge 22.

According to an embodiment, said sealing arrangement 7 comprises a seat sealing arrangement length 23 adhering both to said opposite supporting seat edge 20, and to said pin seat inner surface 24 and to said supporting side seat edge 22.

According to an embodiment, said pin sliding portion 5 is a bushing 25 fitted over said guide pin 4. Said guide pin 4 comprises, for example, a stay bolt 29 firmly connected to a caliper support 21 onto which said bushing 25 is fitted.

According to an embodiment, said sealing arrangement Z comprises at least one coupling portion 15 accommodated in a pin coupling seat 16 provided in said bushing 25, thus constraining said sealing arrangement 7 to said bushing 25.

Said sealing arrangement channel 11 is open and in communication with said coupling portion 15.

According to an embodiment, said sealing arrangement comprises two coupling portions 15 placed at opposite ends of said sealing arrangement 7 and accommodated in two respective pin coupling seats 16 provided in said bushing 25, constraining said sealing arrangement 7 to said bushing 25.

Said sealing arrangement channel 11 is open and in communication with one of said coupling portions 15.

According to an embodiment, said bushing 25 is sandwiched between a guide pin head 26 provided in said stay bolt 29 and said caliper support 21.

The present invention further relates to a method for moving a floating caliper with the wearing of the friction material of the pads 27, which abut against opposite braking surfaces of a brake disc 3.

This method for moving a floating caliper 1 provides sliding said floating caliper 1 over at least one guide pin 4 during the action of braking and wearing the pads 27 and brake disc 28.

Said method comprises at least the following steps:

providing a floating caliper 1 as defined in any one of the embodiments described above;

during the wear of the pad 27 and/or the brake disc 28, moving said floating caliper 1 so that said coupling portion 15 of the sealing arrangement 7 enters said pin seat 6.

REFERENCES

1 brake caliper
1 floating caliper
2 caliper body
3 brake disc
4 guide pin or secondary guide pin
5 pin sliding portion
6 pin seat
7 sealing arrangement
8 sealing arrangement body 9 sealing arrangement outer surface
10 sealing arrangement inner surface
11 sealing arrangement channel
12 sealing arrangement foot
13 sealing arrangement foot thickness
14 sealing arrangement thickness
15 coupling portion
16 pin coupling seat
17 folding sealing arrangement portion
18 folding sealing arrangement portion axial loop
19 folding sealing arrangement portion radial loop
20 opposite supporting seat edge
21 caliper support
22 supporting side seat edge
23 seat sealing arrangement length
24 pin seat inner surface
25 bushing
26 guide pin head
27 pad
28 brake disc
29 stay bolt
30 main guide pin
31 main guide pin seat
32 main guide pin sealing arrangement
33 piston
34 cylinder
35 bleeding device
A-A axial direction
R-R radial direction
C-C circumferential direction
T-T tangential direction
X-X rotation axis of the brake disc
L predetermined length of the pin sliding portion
S pin seat axial extension
C reduced sealing arrangement contact surface axial extension

The invention claimed is:

1. A floating caliper, comprising:
a caliper body arranged straddling a brake disc, said brake disc rotating about a rotation axis which defines an axial direction, a radial direction orthogonal to said axial direction, and a circumferential direction orthogonal to both said axial direction and said radial direction;
wherein said caliper body is movably supported in axial direction at at least one guide pin;
said at least one guide pin comprises a pin sliding portion of predetermined pin axial extension;
said caliper body comprises a pin seat which slidingly accommodates a portion of said pin sliding portion;
said pin seat has a predetermined pin seat axial extension said floating caliper further comprises a sealing arrangement interposed between said pin seat and said guide pin;
said sealing arrangement comprises a tubular-shaped sealing arrangement body made in one piece which crosses said entire pin seat;
said sealing arrangement comprises a sealing arrangement outer surface, a portion of which is in contact with said pin seat;
said sealing arrangement comprises a sealing arrangement inner surface, a portion of which is in contact with said pin sliding portion;
wherein the portion of the sealing arrangement outer surface that is in contact with said pin seat is substantially longer than the portion of the sealing arrangement inner surface that is in contact with the pin sliding portion, thus creating at least one sealing arrangement channel between said sealing arrangement and said pin sliding portion;
wherein said at least one sealing arrangement channel is open to come out of said pin seat; and
wherein said sealing arrangement channel is adapted to receive at least one coupling portion therein;
wherein in an operating condition the at least one coupling portion, or a pin coupling seat, is adapted to be radially aligned below the sealing arrangement channel.

2. The floating caliper according to claim 1, wherein said sealing arrangement comprises a sealing arrangement foot which forms said sealing arrangement inner surface and has a sealing arrangement foot thickness equal to the predefined distance between said pin sliding portion and said pin seat; and
wherein with the exception of said sealing arrangement foot, the remaining sealing arrangement portions of said sealing arrangement have a sealing arrangement thickness, said thickness assessed in a section obtained via a plane comprising an axial direction and a radial direction, which is less than said thickness of sealing arrangement foot; and/or
wherein said sealing arrangement foot has a section in a plane comprising an axial direction and a radial direction which is trapezoidal in shape, with smaller base facing said pin sliding portion.

3. The floating caliper according to claim 2, wherein when the floating caliper is in position of pads and brake disc not worn, said sealing arrangement foot delimits two opposite sealing arrangement channels between said sealing arrangement and said pin sliding portion.

4. The floating caliper according to claim 2, wherein the sealing arrangement channel foot comprises two shoulders, wherein said two shoulders are radially between said pin seat and said pin sliding portion, and are each planar.

5. The floating caliper according to claim 1, wherein said sealing arrangement comprises the at least one coupling portion, and wherein said at least one coupling portion is accommodated in the pin coupling seat, thus restraining said sealing arrangement to said pin sliding portion; and wherein
said sealing arrangement channel is open and in communication with said coupling portion.

6. A method for moving a floating caliper by sliding it over a guide pin during of braking and wearing of a pad and/or a brake disc, comprising the steps of:
providing the floating caliper as defined in claim 5;
during the wear of the pad and/or the brake disc, moving said floating caliper so that said coupling portion of the sealing arrangement enters said pin seat.

7. The floating caliper according to claim 1, wherein when the floating caliper is in position of pads and brake disc not worn, said sealing arrangement comprises at least one folding sealing arrangement portion; wherein
said folding sealing arrangement portion forms at least two loops, said loops comprising a folding sealing arrangement portion axial loop and a folding sealing arrangement portion radial loop; wherein
said folding sealing arrangement portion axial loop has concavity facing the axial direction and
said folding sealing arrangement portion radial loop has concavity facing the radial direction.

8. The floating caliper according to claim 1, wherein said pin seat is delimited on one side the side facing the vehicle by an opposite supporting seat edge; and wherein said pin seat is delimited on the side facing a caliper support by a supporting side seat edge; and wherein said pin seat is delimited by a pin seat inner surface which extends between said opposite supporting seat edge and said supporting side seat edge; and wherein said sealing arrangement comprises a seat sealing arrangement length which embraces said opposite supporting seat edge, said pin seat inner surface, said supporting side seat edge or said sealing arrangement comprises a seat sealing arrangement length which adheres to said opposite supporting seat edge, said pin seat inner surface, said supporting side seat edge.

9. The floating caliper according to claim 1, wherein said pin sliding portion is a bushing fitted above said guide pin, and wherein said guide pin comprises a stay bolt firmly connected to a caliper support on which said bushing is fitted, and wherein said sealing arrangement comprises said at least one coupling portion accommodated in the pin coupling seat provided in said bushing, thus restraining said sealing arrangement to said bushing; and wherein said sealing arrangement channel is open and in communication with said coupling portion.

10. The floating caliper according to claim 9, wherein said bushing is sandwiched between a guide pin head provided in said stay bolt and said caliper support.

11. A floating caliper, comprising:

a pin seat, a pin sliding portion, a sealing arrangement, wherein said sealing arrangement comprises at least one coupling portion, wherein said sealing arrangement is directly attached to said pin sliding portion via the at least one coupling portion, wherein at least one portion of an outer portion of said sealing arrangement is in direct facing contact with the pin seat, wherein at least one portion of an inner portion of said sealing arrangement is in direct facing contact with the pin sliding portion, wherein said at least one portion of said outer portion of said sealing arrangement that is in direct facing contact with the pin seat is longer than said at least one portion of said inner portion of said sealing arrangement that is in direct facing contact with said pin sliding portion, and a sealing arrangement channel, wherein said sealing arrangement channel is adapted to slide axially and receive the at least one coupling portion therein so that the at least one coupling portion is adapted to be radially aligned below the sealing arrangement channel.

* * * * *